3,832,323
THIXOTROPIC B-COMPONENT FOR POLYURETHANE ELASTOMERS

Bobbie Joe Ramey and Philip Hotchkiss Moss, Austin, Tex., assignors to Jefferson Chemical Company, Inc., Houston, Tex.
No Drawing. Filed Mar. 12, 1973, Ser. No. 339,993
Int. Cl. C08g 22/20, 51/04
U.S. Cl. 260—37 N                              13 Claims

ABSTRACT OF THE DISCLOSURE

A thixotropic B-component for the production of polyurethane elastomers is disclosed whereby the B-component is comprised of an inert filler and a polyether polyol reactant wherein at least 1% by weight of the polyether polyol reactant is a polyether polyol wherein from about 5% to about 55% of the hydroxyl groups have been replaced with amino groups.

BACKGROUND OF THE INVENTION

The preparation of polyurethane elastomers is well known and over the last few years the use of these materials has increased sharply. The application of these materials seems limited only by the imagination of the user and it is anticipated that new uses will continue to be found. One attractive feature of the polyurethane elastomer is that an inexpensive filler can be incorporated into the polymer replacing some of the more costly ingredients without detrimentally affecting the physical properties.

These polyurethane materials have found uses, for example, as floor coatings, sealants, gaskets, carpet backing materials, automobile bumpers, and many other uses. In many cases polyurethane elastomers have replaced other materials for such uses. One particular area of desirable use for polyurethane elastomers is as a backing for carpets. It is particularly important in preparing a carpet backing that the elastomer prior to curing not "strike through" the carpet fabric backing but exhibits sufficient viscosity to lay on the carpet backing where applied without seeping through while curing. However, when the reaction components are mixed prior to application to the fabric it is desirable that they have a low viscosity. Therefore, it is desirable that the reaction mixture exhibit thixotropic properties so that it has a low viscosity while the components of the urethane elastomer are being mixed and poured but also has a high viscosity once the material is at rest. Therefore, the polyurethane system applied as a carpet backing should be thixotropic. Another important use is as a joint sealant in building construction. Often the joints are overhead or vertical. In such cases it is important that the sealant be viscous enough to remain in the joint or crack being sealed without dripping or running. In short, these systems need to be thixotropic. This desirability for a thixotropic polyurethane system has been previously recognized by those skilled in the art. Previously, thixotroping agents such as calcium-organic compounds or fumed colloidal silica would be added to the polyurethane B-component. These conventional thixotroping agents are well known and commonly available to those skilled in the art. However, though such agents would impart thixotropic properties to the B-component and ultimately to the unreacted polyurethane system, the materials are very finely divided powders which are messy to transfer and difficult to blend into the B-component. Further, even after it had been blended with the B-component it would require a separate high-speed, high-shear dispersing step in order to obtain the desired thixotropic property. Also, the addition of these extraneous thixotroping agents to the B-component required that the mix ratio of B-component and A-component be changed since the equivalent weight of the B-component was changed by the addition of the thixotroping agent. As is readily seen from this phenomenon, the necessity of making small changes to produce the thixotropic B-component resulted in the necessity to overhaul the polyurethane system itself. It can readily be seen that there are many disadvantages to this particular method of obtaining desired, if not necessary, thixotropic properties.

Accordingly, it is the object of this invention to provide a thixotropic B-component without the necessity of incorporating therein extraneous thixotroping agents. It is a further objective of this invention to obtain thixotropic properties by adjusting the composition of the polyol component in the system.

It is a still further objective of this invention to provide a B-component including a filler which has thixotropic properties without the incorporation therein of extraneous thixotropic agents.

SUMMARY OF THE INVENTION

This invention relates to the preparation of a B-component for a filled polyurethane elastomer system which exhibits thixotropic properties. The B-component is comprised of a filler and a polyether polyol reactant wherein at least one weight percent of the polyether polyol reactant is a partially aminated polyether polyol wherein from about 5% to about 55% of the hydroxyl groups are replaced with amine groups. Herein, the terms "partially aminated polyether polyol" and "polyoxyalkylene resin having amine groups" are to be construed as being synonymous to describe a polyol wherein hydroxyl groups have been replaced by amine groups. The partially aminated polyether polyol may have a functionality of from 2 to 8 and an equivalent weight of from about 900 to about 2800.

While the polyether polyol reactant containing the partially aminated polyether polyol and the filler material are the essential ingredients to obtain thixotropic properties the B-component may contain other materials commonly present in the B-component of polyurethane elastomer system such as polyether polyols, pigments, antioxidants, catalysts, cross-linking agents, chain extending agents, and the like. In order to produce the polyurethane elastomer the thixotopic B-component of our invention is reacted with an A-component, an organic polyisocyanate, to produce the polyurethane elastomer material. The thixotropic B-component imparts its thixotropic nature to the mixed, but uncured, polyurethane reactants such that once the system is discharged from a mixing nozzle the viscosity increases even before the reactants cure.

DESCRIPTION OF THE INVENTION

Since the polyurethane elastomers used as mentioned above are filled systems wherein a filler is present in the range of about 5% to about 80 weight percent of the total weight of the B-component a filler is always present in the thixotropic B-component of our invention. Inorganic fillers include for example, calcined clay, talc, diatomaceous earth, novaculite, calcium silicate, barium sulfate, silica and mixtures thereof; as well as pigments including black iron oxide, brown iron oxide, chromium oxide, titanium dioxide, green and red iron oxides, for example.

Particularly preferred filler mixtures are those in which the major component is a calcined clay such as is commercially available as Burgess No. 30 clay or Georgia Kaolin's Glomax PVR clay or Freeport Kaolin's SP-33 clay. Generally, however, any fillers and pigments normally used in the polyurethane are applicable to the practice of our invention, even those which are organic in nature such as, cut up tires and plastics or phenolic microballoons, for example.

The essential component which imparts the thixotropic property to the B-component of our invention is a polyoxy alkylene resin having partial amino termination within the molecule with the rest of the terminal functional groups being hydroxl groups. We have discovered that the presence of as low as 1% (by weight) of the partially aminated polyoxyalkylene resin imparts the thixotropic property to the B-component. Further, this partially aminated polyoxyalkylene resin can also be the sole polyol reactant of the entire system except for such reactive cross-linkers as may be added. However, for purposes of this discussion the reactive cross-linker will be considered to be an ingredient of the B-component apart from the polyether polyol reactant. Such reactive cross-linker would be considered in determining the isocyanate index of the mixture of A-component and B-component to comprise the reactive polyurethane system.

The polyoxyalkylene resin used in the practice of our invention to produce filled polyurethane elastomers is prepared by partially aminating to the extent of about 5% to about 55% of the terminal hydroxyl groups of polyoxyalkylene polyols having a functionality of from 2 to 8 and an equivalent weight of from about 900 to about 2800 (hydroxyl number of about 20 to about 60) by reacting ammonia with said polyoxyalkylene polyol at elevated temperatures and pressure in the presence of hydrogen and a hydrogenation-dehydrogenation catalyst. A preferred method for performing the process for preparing such partially aminated polyether polyols is described and exemplified later herein.

The remaining functional groups of the polyoxyalkylene resin useful in the practice of our invention are hydroxyl groups and can be either primary or secondary hydroxyl groups. As stated heretofore from 5% to 55% of the hydroxyl groups are replaced with amine groups. It is preferred that about 17% to about 47% be amine groups and especially preferred that from about 20% to amout 30% be amine groups. Where the polyether polyol starting material has both primary and secondary hydroxyl groups, the partially aminated polyoxyalkylene resin used in the practice of this invention may have from about 45% to about 85% primary hydroxyl groups and 0 to about 50% secondary hydroxyl groups. It is preferred that the primary hydroxyl groups be from about 50% to about 65% and the secondary hydroxyl groups from 0 to about 15%.

The polyether polyols to be partially aminated are prepared by adding an alkylene oxide to a suitable polyhydric initiator having from 2 to 8 reactive hydroxyl groups until an equivalent weight of from about 900 to about 2800 is obtained. The reaction is well known to those skilled in the art and suitable initiators and alkylene oxides are described in U.S. Pats. 3,655,590; 3,535,307 and 3,194,773 for example. Preferred initiators are, for example, ethylene glycol, propylene glycol, glycerol, trimethylolpropane, sorbitol, sucrose, methyl glucoside, and the like. The preferred initiators would be those having two or three reactive hydrogen atoms, for example, propylene glycol, ethylene glycol, glycerol, trimethylolpropane, and the like.

The alkylene oxide used may be ethylene oxide, propylene oxide, butylene oxide or higher alkylene oxides having up to 18 carbon atoms or mixtures thereof. When mixed oxides are used, they may be added to the polyhydric initiator either sequentially to form block polyether polyols as described in U.S. Pat. 3,535,307 or may be mixed and reacted simultaneously to form a random, or heteric, oxyalkylene chain. If desired, terminal primary hydroxyl groups can be achieved by reacting ethylene oxide in a last step as described, for example, in U.S. Pat. 3,535,307 or 3,336,242. This primary hydroxyl termination can be from about 45% to about 85% of the hydroxyl groups on the polyoxyalkylene polyol. The reaction of the alkylene oxides with the polyhydric initiator is well known to those skilled in the art and occurs under basic conditions established through the use of alkali metals, their hydroxides, oxides and hydrides and in some cases basic amines.

The molecular weight can be determined by analysis for the hydroxyl number which is proportional to the hydroxyl concentration per unit weight. The hydroxyl number is defined in terms of KOH equivalent per gram of alkylene oxide-initiator reaction product and is determined using well known methods. The equivalent weight, of course, bears a relationship to the molecular weight based upon the number of hydroxyl groups in the molecule and is determined from the hydroxyl number by using the following formula:

$$\text{Eq. W.} = \frac{56.1 \times 1000}{\text{OH No.}}$$

The equivalent weight of the polyol used for amination and that of the aminated product itself for purposes of the practice of our invention will be substantially the same since a hydroxyl group having a molecular weight of 17 is replaced by an amino group having a molecular weight of 16. The equivalent weight of the polyoxyalkylene resins useful for the practice of our invention, as stated heretofore, is from about 900 to about 2800 with a preferred range of about 1500 to about 2300. This latter preferred range is particularly applicable when difunctional or trifunctional materials are used.

The polyoxyalkylene resins useful in the practice of our invention are prepared by reacting the above described polyether polyols with ammonia in the presence of a hydrogenation-dehydrogenation catalyst at elevated temperatures and pressures in the presence of hydrogen. While many catalysts are useful for this reaction, the preferred catalyst is prepared by reducing a mixture of the oxides of nickel, copper and chromium as described in U.S. Pat. 3,152,998. The reaction is carried out from about 160 to about 250 degrees C. at a reaction pressure of from 750 to about 4000 p.s.i.g. with the hydrogen partial pressure of at least about 300 p.s.i.g. The reaction can be carried out either continually or in a batch manner. An example follows describing the production of a polyoxyalkylene resin useful in the practice of our invention.

EXAMPLE A

Prepartion of Polyoxyalkylene Resin

This example will illustrate the preparation of the partially polyoxyalkylene resin used in the practice of our invention. A polyoxyalkylene triol having a hydroxyl number about 25.5 (equivalent weight about 2200) and capped with ethylene oxide to give 65% primary and 35% secondary hydroxyl groups, was pumped at a rate of 1.70 pounds per hour through a fixed bed continuous catalytic reactor 59.5 inches long and having a 1.25 inch internal diameter. The vertical reactor contained 1000 ml. of a pelleted nickel-copper-chromia catalyst (see U.S. Pat. 3,152,998) having about 70 mol percent nickel, 22 mol percent copper and 3 mol percent chromium on an oxide-free basis. The second reactor feed was anhydrous ammonia, introduced to the same reactor at 0.20 pounds per hour. A 75% hydrogen/25% nitrogen (mol ratio) gas was passed through the reactor at a rate of 160 liters per hour (standard temperature and pressure). Conditions were 1000 p.s.i.g. and 194–198° C. for the 5.5 hour run. Product, which contained traces of catalyst fines, was filtered through filter aid and then stripped free of ammonia and water at final conditions of 110° C. and 2 mm. A light colored, clear viscous liquid weighing 3500 g. was recovered. Titration of a sample of the product in isopropanol solution was 0.1993 N hydrochloric acid showed that 23% of the hydroxyl groups had been converted to amino groups. By Kjeldahl analysis, nitrogen content was 0.14% and total acetylatables was 0.375 meq/gm.

While the above example is useful for instructional purposes, it should not be deemed limiting and polyoxyalkylene resins as described herein useful in our invention can be manufactured by any method known to those skilled in the art.

In addition to the polyoxyalkylene resins mentioned above, conventional polyether polyols are preferably used in admixture with the aminated polyoxyalkylene resin above described in the practice of our invention.

These conventional polyether polyols useful in the practice of our invention with the partially aminated polyols are those diols, triols, tetrols and mixtures thereof having a molecular weight of from about 500 to about 10,000. Preferably, the conventional polyether polyols will be within a molecular weight range of about 1800 to about 8000 and, most preferably, from about 3000 to about 7000.

The diols are generally polyalkylene ether glycols such as polyoxypropylene glycols, polyoxybutylene glycols, polyoxypropylene-polyoxyethylene glycols and the like, and mixtures thereof. Higher functionality polyether polyols can also be used such as the condensation products of alkylene oxides, as hereinbefore mentioned, with polyhydric alcohols having three or four hydroxyl groups such as glycerol, trimethylolpropane, 1,2,6-hexanetriol, pentaerythritol, and the like. These polyether polyols are well known and may be prepared by any known process such as, for example, the processes discussed in Encyclopedia of Chemical Technology, volume 7, pages 257–262, published by Interscience Publishers Inc. in 1951.

As mentioned above, any suitable polyhydric polyalkylene ether may be used, such as, for example, the condensation product of an alkylene oxide with a polyhydric alcohol. Any suitable polyhydric alcohol may be used such as, for example, ethylene glycol, 1,2-propylene glycol, 1,3-propylene glycol, 1,4-butylene glycol, 1,3-butylene glycol, glycerine, trimethylolpropane 1,2,6-hexanetriol, pentaerythritol, and the like. Any suitable alkylene oxide may be used such as, for example, ethylene oxide, propylene oxide, butylene oxide, amylene oxide, their various isomers, and the like, and mixtures thereof. Of course, the polyhydric polyalkylene ether polyols can be prepared from other starting materials such as, for example, tetrahydrofuran, epihalohydrins, aralkylene oxides, such as, for example, styrene oxide, and the like.

Blended diols and triols for use in solid polyurethane elastomers is generally discussed in U.S. Pat. No. 3,391,101. Most preferred for use with the partially aminated polyols are the polyoxyalkylene diols and diols blended with polyoxyalkylene triols and tetrols having a molecular weight of from about 3,000 to about 7,000.

The polyether polyols may have primary or secondary hydroxyl group termination. When the polyhydric alcohol is reacted with an alkylene oxide such as propylene oxide, butylene oxide, and the like, the terminal groups are predominately secondary hydroxyl groups. However, it is within the scope of our invention to use polyether triols and polyether tetrols which have from about 5 to about 15 wt. percent ethylene oxide added thereto in a final alkoxylation step by the known alkylation processes in order to increase the terminal primary hydroxyl content of the said polyether polyol. The manufacture of ethylene oxide "tipped" polyether polyols is generally discussed in U.S. Pat. No. 3,336,242.

As hereinbefore stated as little as 1 wt. percent of the polyoxyalkylene polyol aminated to from about 5% to about 55% is useful in the practice of our invention. The entire polyether polyol reactant can be partially aminated. However, it is preferable to prepare a polyether polyol reactant blend of from about 15 wt. percent to about 50 wt. percent of the partially aminated polyoxyalkylene resin with the balance of the polyether polyol reactant being one of the beforementioned conventional polyether polyols.

It is especially preferred that a polyether diol based upon a polyoxypropylene, polyoxyethylene glycol having from 45 to about 65% primary hydroxyl groups be mixed in the B-component with a trifunctional partially aminated polyoxyalkylene ether material having an equivalent weight from about 900 to about 2800.

The above discussed fillers and partially aminated polyoxyalkylene resins comprise the essential ingredients of the B-component of our invention and, in combination, exhibit the desired thixotropic property. Preferably, however, the polyether reactant in the B-component will be a blend of polyether polyols and the partially aminated polyether polyol.

This B-component is admixed with an organic polyisocyanate which reacts with the hydroxyl and/or amino groups in the B-component. While the mixing is occurring the reaction mixture exhibits the low viscosity typical of thixotropic materials under conditions of high shear. Once mixed and discharged from the mixing head the reactants become viscous when the shearing force is removed and the reactants stay in place until the reaction has proceeded to the point where the solid, filled elastomer is formed. This increase in viscosity when the reactants are discharged from the mixing head keep the material from seeping through a material being coated or running when a vertical seam is being sealed.

Suitable organic polyisocyanates useful in the practice of our invention are those organic diisocyanates, triisocyanates and polyisocyanates well-known in the polyurethane art. Mixed isomers of toluene diisocyanate, which are readily available commercially, such as those described in U.S. Pat. No. 3,293,976 and the like may be used. Especially preferred are diisocyanates and polyisocyanates prepared by the phosgenation of the reaction product between aniline and formaldehyde such as 4,4'-diphenylmethane diisocyanate, 2,4'-diphenylmethane diisocyante and higher functionality polymethylenepolyphenylisocyanates, hereinafter called polyarylpolyisocyanates. Especially preferred organic polyisocyanates for forming solid polyurethane compositions are diphenylmethane diisocyanates and modified diphenylmethane diisocyanates sold under the trademark of Isonate® 143L. Polyarylpolyisocyanates which are used in the practice of our invention, have an average functionality of from about 2.0 to about 4.0. An especially preferred functionality range is from about 2.2 to about 2.9. These polymethylenepolyphenyl polyisocyanates generally have the structural formula:

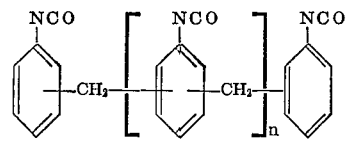

wherein $n$ has an average value greater than 0 to provide an average functionality of the polyarylpolyisocyanate of greater than 2.0. The upper limit of the functionality of the polyaryl isocyanate is determined by the process by which it is made. It is especially, preferred that the average functionality be in the range of 2.2 to about 3.3 ($n=0.2$–$1.3$). This is the especially preferred range to use to produce polyurethane elastomer compositions.

While not being limited to the methods disclosed, polyarylpolyisocyanates used in the practice of our invention can be made as discussed in U.S. Pats. Nos. 3,344,162 and 3,362,979, for example. See also U.S. Pat. 3,194,773, for example.

The foregoing reaction of the isocyanate and the B-component is generally catalyzed through the use of about 0.1 weight percent to about 6 weight percent, based on the weight of the polyether polyol reactant, of a catalyst of urethane formation. Catalysts useful in practice of this invention are those well known catalysts which catalyze the reaction between the isocyanate and hydroxyl groups, such as organometallic catalysts including organo-tin, mercury, lead, bismuth, and arsenic compounds, for example. Specifically, suitable catalysts include arsenic trichloride, antimony trichloride, antimony pentachloride, antimony tributoxide, bismuth trichloride, titanium tetrachloride, bis(cyclopentadienyl)titanium difluoride, titanium chelates (such as octylene glycol titanate), dioctyl lead dichloride, dioctyl lead diacetate, dioctyl lead oxide, trioctyl lead chloride, phenylmercuric acetate, phenylmercuric propionate, chlorphenylmercuric propionate and the like. Particularly useful organotin catalysts are described in U.S. Pat. 3,194,773, for example, and particularly useful organo-mercuric catalysts are described in U.S. Pat. No. 3,583,945, for example. It is these latter mercuric catalysts which are especially preferred for use in the practice of our invention.

It is also common in the preparation of polyurethane elastomers to employ chain extenders and/or cross-linkers having a low molecular eight, usually less than 500, which are di- or trifunctional active hydrogen-containing compounds such as glycols, triols or tetrols, diamines and amino alcohols or mixtures thereof. While not critical to the practice of our invention, cross-linking agents which are useful are trihydric alcohols such as trimethylopropane, glycerine, 1,2,6-hexane triol, for example, or the cross-linking agents could be low molecular weight propylene oxide or ethylene oxide adducts of triols and tetrols such as trimethylolpropane, glycerine, pentaerythritol, etc. Especially preferred cross-linking agents are those carbamates described in U.S. Pat. 3,595,814 such as 2-hydroxyethyl 2-hydroxyethylcarbamate, 2-hydroxyethyl 2-hydroxypropyl carbamate, and 2-hydroxyethyl 2-(hydroxyethoxy)ethyl carbamate, for example. The amount of such cross-linking agents or chain-extending agents used is relatively small and varies from about 0.01 wt. percent to about 10 wt. percent of the weight, preferably from about 1 wt. percent to about 3 wt. percent, of the B-component, depending upon the properties desired in the final urethane elastomer.

The cross-linking agent provides additional branching and therefore decreases elongation and increases tensile strength, modulus, hardness and compression strength for the final polyurethane elastomer composition. Variation of the cross-linker content adds versatility to the basic elastomeric material. While it may be incorporated in either the polyether polyol component or with the isocyanate component (A-component) it is preferred to incorporate the cross-linking agent with the B-component. This is done to maintain the integrity of a one-shot system, for, if added to the A-component, the hydroxyl groups of the cross-linking agent would react with the isocyanate groups of the isocyanate to produce a prepolymer.

Other additives well known in the polyurethane art may be present in the thixotropic B-component of our invention. These additives are materials such as antioxidants, for example, 2,6-di-$t$-butyl-$p$-cresol (DBPC). We have found that the presence of such additives do not interfere with the thixotropic property exhibited by the B-components of our invention. Such additives are generally known to those skilled in the art and their incorporation is discussed in "Polymer Additives Guide Book and Directory, 1972" published by Noyes Data Corporation, for example.

In reacting the organic isocyanate of the A-component with the hydroxyl and/or amine groups of the thixotropic B-component of our invention either a one-shot or a prepolymer system can be used. The prepolymer method of preparing a solid polyurethane elastomer is well known but the one-shot system is, of course, the preferred embodiment of the practice of our invention.

In producing the polyurethane elastomer composition from the thixotropic B-component of our invention the A-component and B-component are combined such that the resulting mixture has a ratio of isocyanate groups in the A-component to the reactants in the B-component, including the reactive sites of other additives (i.e., the cross-linker or chain extender) if any, of about 0.9:1 to about 1.4:1. It is preferred that this ratio, the so-called isocyanate index, range from 1:1 to about 1.3:1 and especially preferred that the range vary between 1.05:1 and about 1.25:1. It is within these ranges that the most desirable balance of advantageous physical properties and ambient temperature curing properties are achieved.

The foregoing description of our invention will be further illustrated by the following examples which are offered for purposes of instruction only and should not be construed as limiting the scope of the above described invention.

EXAMPLE 1

This example illustrates the preparation of an uncatalyzed, highly thixotropic B-component. The "partially aminated polyether polyol" used was a polyol prepared by amination, in the manner described in Example A, of about 24 weight percent of the hydroxyl groups of a 6500 molecular weight polyoxypropylene, oxyethylene triol based upon trimethylolpropane having a hydroxyl number of about 25 (equivalent weight of about 2200) and having about 50% primary hydroxyl groups. This material is referred to as an aminated polyol. The B-component was prepared by the following steps: (a) 820 g. aminated polyol, 1640 g. Thanol® E 4003 diol (a polyoxypropylene, polyoxyethylene diol having about 50% primary hydroxyl groups and a molecular weight of about 4000 sold by Jefferson Chemical Company, Inc.), 1357 g. calcined clay, 151 g. talc, and 9 g. burnt umber pigment were well-blended in a 1-gallon can. (b) The blended mixture was transferred to a 4-liter suction flask equipped with heater, thermometer, and vacuum source. The mixture was stripped of moisture by heating it under vacuum with shaking to a temperature of 125° C. (c) after stripping, the blend was cooled to a temperature of 75° C. (d) The vacuum was released and 5.04 g. DBPC and 66 g. 2-hydroxyethyl 2-hydroxypropyl carbamate were added. (e) The mixture was cooled to room temperature under vacuum and with shaking. The resultant B-component thus prepared had the weight percent composition shown below in Table 1.

TABLE 1

| Ingredient: | Amount (wt. percent) |
|---|---|
| Aminated polyol | 20.3 |
| E-4003 diol | 40.5 |
| Calcined clay | 33.5 |
| Talc | 3.7 |
| Burnt umber pigment | 0.22 |
| 2-hydroxyethyl 2-hydroxypropyl carbamate | 1.63 |
| DBPC antioxidant | 0.12 |

A portion of the B-component was brought to a temperature of 25° C. and it was found to have the viscosity shown in Table 2. The viscosity data was obtained with a No. 4 spindle using a Brookfield LVT viscometer.

TABLE 2

| Spindle speed (r.p.m.): | Viscosity (cps.) |
|---|---|
| 3 | 62,000 |
| 6 | 41,400 |
| 12 | 28,500 |
| 30 | 18,700 |

EXAMPLE 2

This example will illustrate that the good thixotropy of the uncatalyzed B-component of Example 1 is maintained after addition of catalyst. It will also illustrate that the initial mixture of A-component (organic polyisocyanate) and B-component is thixotropic and further, that the mixture of A-component and B-component gives a cured elastomer of good physical properties.

A mixture of 100 g. of the B-component of Example 1 and 2.02 g. phenylmercuric propionate catalyst was warmed to 75° C. with stirring, and then cooled to room temperature to give a catalyzed B-component having the composition shown in Table 3.

TABLE 3

| Ingredient: | Amount (wt. percent) |
|---|---|
| Aminated polyol (Example 1) | 20.2 |
| E-4003 diol | 40.4 |
| Calcined clay | 33.5 |
| Talc | 3.7 |
| Burnt umber pigment | 0.22 |
| 2-hydroxyethyl 2-hydroxypropyl carbamate | 1.63 |
| DBPC antioxidant | 0.12 |
| Catalyst | 0.20 |

A portion of the catalyzed mixture was brought to about 25° C. and was found to have the viscosity shown in Table 4 (Brookfield LVT, No. 4 spindle).

TABLE 4

| Spindle speed (r.p.m.): | Viscosity (cps.) |
|---|---|
| 3 | 72,400 |
| 6 | 45,500 |
| 12 | 29,700 |
| 30 | 18,360 |

In two separate experiments, portions of the catalyzed B-component were mixed with a polyarylpolyisocyanate A-component (PAPI® 901 (Upjohn)—polymethylene polyphenylisocyanate having an average functionality of 2.6) at a mix ratio of 100 parts by weight component B to 7.6 parts component A.

In each case a total of 134.5 g. of mixed components was obtained in each paper cup. After one minute of mixing the mixtures were poured into 2nd cups and the viscosity taken with a No. 4 spindle using a Brookfield LVT viscometer. In each case the mixture was initially at 25° C. When the 12 r.p.m. spindle speed was used on one mixture the 4-minute viscosity of the curing mixture was 13,100 cps.; however, when the 3 r.p.m. spindle speed was used on the other mixture the 4-minute viscosity of the curing polyurethane mixture was 34,000 cps.—thus illustrating good thixotropy in the curing mixture. In both cases the gel time was in the 33–37 minute range and final Shore $A_2$ 0-sec. (initial) hardness on cured elastomer was in the 53–56 range. An additional run in which 463 g. of catalyzed B-component and 35.2 g. of PAPI® 901 A-component were mixed was made for purposes of casting samples for determination of additional physical properties of the solid elastomer. The physical properties are shown in Table 5.

TABLE 5

| Property: | Value |
|---|---|
| Tensile strength p.s.i. | 526 |
| 100% modulus p.s.i. | 320 |
| Elongation percent | 337 |
| Tear strength, Die C p.s.i. | 99 |
| Compressive strength at 10% deflection p.s.i. | 80 |
| 25% compression set, Method B percent | 16.0 |

EXAMPLE 3

A B-component prepared from some of the unaminated polyol, which was used as the precursor for the aminated polyol of Example 1, having the composition of Table 6 was found to exhibit very low thixotropy, as shown by the viscosity data of Table 7.

TABLE 6

| Ingredient: | Amount (wt. percent) |
|---|---|
| Polyether Triol [1] | 20.2 |
| Thanol E-4003 | 40.4 |
| Calcined clay | 33.4 |
| Talc | 3.7 |
| Burnt umber pigment | 0.22 |
| 2-hydroxyethyl 2-hydroxypropyl carbamate | 1.63 |
| DBPC antioxidant | 0.12 |
| Catalyst (phenylmercuric acetate) | 0.22 |

[1] Polyoxypropylene, polyoxyethylene triol having a molecular weight of 6500 and a primary hydroxyl content of 50%.

TABLE 7

Brookfield LVT/25° C. No. 4 spindle

| spindle speed (r.p.m.) | viscosity (cps.) |
|---|---|
| 3 | 11,600 |
| 6 | 10,800 |
| 12 | 9,900 |
| 30 | 9,900 |

Thus, the high thixotropy previously shown (Tables 2 and 4) for B-components containing the partially aminated polyether polyol used in Example 1 is no longer present when the corresponding unaminated polyether polyol is used.

EXAMPLE 4

A B-component was prepared to have the same composition shown in Table 3 except the aminated polyol of Example 1 was replaced by the unaminated polyol of Example 3. The B-component had a low degree of thixotropy as shown by the viscosity data of Table 8. This low thixotropy illustrates that the poor thixotropy of the composition of Table 6 was not due to the inclusion of phenylmercuric acetate catalyst since low thixotropy is also obtained in this example with phenylmercuric propionate catalyst present.

TABLE 8

Brookfield LVT/25° C. No. 4 Spindle

| Spindle speed (r.p.m.): | Viscosity (cps.) |
|---|---|
| 3 | 8,600 |
| 6 | 8,600 |
| 12 | 8,150 |
| 30 | 7,480 |

EXAMPLE 5

A mixture of 3000 g. B-component of Example 3 and 180 g. "Cab-O-Sil" (thixotroping agent) were blended in a one-gallon can. Both a high-lift mixer, then a high shear Premier dispersator were used. The addition of the Cab-O-Sil requires the mix ratio (by weight) to be changed from 100 B-component/7.6 A-component to 100 B/7.2 A in order for the same isocyanate index to be maintained in making an elastomer with the present B-component as compared to the use of the B-component of Example 3.

The Cab-O-Sil addition caused the viscosity of the B-component to increase to the values shown in Table 9.

TABLE 9

Brookfield LVT/25° C. No. 4 Spindle

| Spindle speed (r.p.m.): | Viscosity (cps.) |
|---|---|
| 3 | 24,800 |
| 6 | 24,000 |
| 12 | 22,800 |

As compared to our invention, the prior art illustrated by the Cab-O-Sil addition of this example suffers from various disadvantages including the fact that the mix ratio must be changed with each change in thixotropy agent, additional primary dispersator high shear mixing equipment is required, and the final thixotropy was not as high when compared with the practice of our invention.

EXAMPLE 6

A B-component was prepared by the general procedure described in Example 1 but without the aminated polyol, to produce the composition shown in Table 10. (This B-component would be analogous to that obtainable by addition of 5 grams of Ircogel® 900 additive per 100 grams of the B-component of Example 4.)

TABLE 10

| Ingredient | Grams | Weight percent |
|---|---|---|
| Polyether triol of Example 3 | 820 | 19.3 |
| E-4003 diol | 1,640 | 38.5 |
| Ircogel® 900 (thixotroping agent) | 203 | 4.8 |
| Calcined clay | 1,357 | 31.9 |
| Talc | 151 | 3.5 |
| Burnt umber pigment | 9 | 0.21 |
| 2-hydroxyethyl 2-hydroxypropyl carbamate | 66 | 1.55 |
| DBPC antioxidant | 5.04 | 0.12 |
| Catalyst (phenylmercuric propionate) | 8.19 | 0.19 |

The viscosity (24.4°) of the B-component described in Table 10 and prepared by the process of Example 1 showed only a negligible thixotropy, illustrated in Table 11, even with direct addition of the thixotroping agent.

TABLE 11

Brookfield LVT/No. 4 Spindle

| Spindle speed (r.p.m.): | Viscosity (cps.) |
|---|---|
| 3 | 11,800 |
| 6 | 11,900 |
| 12 | 11,110 |
| 30 | 12,020 |

A mixture of 128.0 g. of the poor thixotropy B-component of this Example and 9.2 g. PAPI® 901 was mixed and poured into a paper cup and the viscosity was taken with a No. 4 spindle. At 3 r.p.m. the 4-min. viscosity was a quite low value of 12,800 cps.

A portion of the poor thixotropy B-component of this Example was added to a one-half gallon can and subjected to intense high shear mixing with a Premier laboratory dispersator. The mixture warmed during the dispersator shearing and was cooled back to approximately 25° C. It now was thixotropic as shown by the viscosity data of Table 12. This illustrates the need for the high shear mixing step necessary when conventional thixotroping agents are used.

TABLE 12

Brookfield LVT/No. 4 Spindle

| Spindle speed (r.p.m.): | Viscosity (cps.) |
|---|---|
| 3 | 35,000 |
| 6 | 26,500 |
| 12 | 20,320 |
| 30 | 14,920 |

The use of the prior art thixotropic additive in this example suffers from the same disadvantages outlined for the prior art agent, Cab-O-Sil®, in Example 5 as compared to the use of our invention.

EXAMPLE 7

A mixture of 64.0 g. of the uncatalyzed B-component of Example 1 and 64 g. of the B-component of Example 3 was blended in a paper cup. After adjusting the temperature to 25° C. the viscosity data of Table 13 was obtained.

TABLE 13

Brookfield LVT/No. 4 Spindle

| Spindle speed (r.p.m.): | Viscosity (cps.) |
|---|---|
| 3 | 52,400 |
| 6 | 35,000 |
| 12 | 24,100 |
| 30 | 16,100 |

Thus even with only about ⅙ (17%) of the polyol reactant (about 10 wt. percent of the B-component) being a partially aminated polyether polyol of our invention, a good thixotropy is noted. A portion of the blend of this example was mixed with PAPI® 901 A-component in an A/B weight mix ratio of 7.6/100 and cured at room temperature to give an elastomer with a Shore $A_2$ 0-sec. hardness of 53–54, measured after five days.

EXAMPLE 8

This example utilizes a partially aminated polyether polyol prepared following the procedure described in Example A by amination of about 53.5% of the hydroxyl groups of a polyoxypropylene, polyoxyethylene triol having an equivalent weight of about 1000 and a primary hydroxyl content of about 50%. A B-component was prepared by the following steps: (a) 920 g. partially aminated polyol, 573 g. calcined clay, and 57 g. talc were well blended in a one-gallon can. (b) The blended mixture was transferred to a 2 liter suction flask equipped with heater, thermometer, and vacuum source. After addition of 6.00 g. trimethylolpropane (TMP) crosslinker, the resultant mixture was stripped of moisture by heating it under vacuum (with shaking) to a temperature of 125° C. (c) After stripping, the blend was cooled to a temperature of 75° C. (d) The vacuum was released and 1.90 g. DRPC antioxidant, 2.24 g. phenylmercuric propionate catalyst, and 26.00 g. 2-hydroxyethyl 2-hydroxypropyl carbamate were added. (e) The mixture was cooled to room temperature under vacuum and with shaking. The resultant B-component thus had the weight percent composition shown below in Table 14.

TABLE 14

| Ingredient: | Amount (wt. percent) |
|---|---|
| Aminated polyol | 58.0 |
| Calcined clay | 36.1 |
| Talc | 3.6 |
| Trimethylolpropane (TMP) | 0.38 |
| 2-hydroxyethyl 2-hydroxypropyl carbamate | 1.64 |
| Phenylmercuric propionate catalyst | 0.14 |
| DBPC antioxidant | 0.12 |

A similar B-component, except that the triol percursor to the partially aminated polyol above (Thanol TE-3000) was used in place of the partially aminated polyol, had the composition of Table 15 and the viscosity shown in Table 16 (Brookfield LVT, No. 4 Spindle, 25° C.).

TABLE 15

| Ingredient: | Amount (wt. percent) |
|---|---|
| Thanol® TE-3000 [1] triol | 58.0 |
| Calcined clay | 36.1 |
| Talc | 3.6 |
| TMP | 0.38 |
| 2-hydroxyethyl 2-hydroxypropyl carbamate | 1.64 |
| Phenylmercuric propionate catalyst | 0.14 |
| DBPC antioxidant | 0.12 |

[1] Jefferson Chemical Company, Inc.

TABLE 16

| Spindle speed (r.p.m.): | Viscosity (cps.) |
|---|---|
| 3 | 8,800 |
| 6 | 8,400 |
| 12 | 8,100 |
| 30 | 7,840 |
| 60 | 7,840 |

A blend of 1.2 g. of the B-component described in Table 14 and 118.8 g. of the B-component described in Table 15 was found to be thixotropic and to have the viscosity shown in Table 17. The composition of the blend is shown in Table 18. The aminated polyol is shown to be about 1 wt. percent of the polyol reactant.

TABLE 17

| Spindle speed (r.p.m.): | Viscosity (cps.) |
|---|---|
| 3 | 76,800 |
| 6 | 47,000 |
| 12 | 30,200 |
| 30 | 18,440 |
| 60 | Off scale |

TABLE 18

| Ingredient: | Amount (wt. percent) |
| --- | --- |
| Aminated polyol | 0.58 |
| Thanol® TE-3000 | 57.4 |
| Calcined clay | 36.1 |
| Talc | 3.6 |
| TMP | 0.38 |
| 2-hydroxyethyl 2-hydroxypropyl carbamate | 1.64 |
| Phenylmercuric propionate catalyst | 0.14 |
| DBPC antioxidant | 0.12 |

An elastomer was prepared by mixing 50.0 g. of the blend having the composition of Table 18 with 6.5 g. of a polymeric isocyanate A-component (Mondur® MRS—Mobay Chemical Company—having a functionality of 2.8) in a paper cup for 60 seconds and pouring the mixture into a second paper cup and allowing the mixture to cure at ambient temperature. The final Shore $A_2$ 0-sec. hardness on the cured elastomer was 76.

EXAMPLE 9

This example utilizes a partially aminated polyether polyol prepared by amination of about 47 weight percent of the hydroxyl groups of Thanol® E-4003 diol (described generically in Example 1). A mixture of 246 g. partially aminated diols, 120 g. calcined clay, 13.2 g. talc, and 0.8 g. burnt umber pigment in a quart can was blended well with an electric mixer. The resultant thixotropic blend of filler and aminated polyol had the viscosity shown in Table 19 (Brookfield LVT, No. 4 spindle, 25° C.).

TABLE 19

| Spindle speed (r.p.m.): | Viscosity (cps.) |
| --- | --- |
| 3 | 16,200 |
| 6 | 11,500 |
| 12 | 8,400 |
| 30 | 5,840 |
| 60 | 4,740 |

A B-component was prepared by the following steps: (a) 353 g. of the filler and aminated polyol blend was transferred to a 1-liter suction flask equipped with heater, thermometer, and vacuum source. The blend was stripped by heating it under vacuum (with shaking) to a temperature of 125° C. (b) The stripped blend was cooled to a temperature of 75° C. (c) The vacuum was released and 6.13 g. 2-hydroxyethyl 2-hydroxypropyl carbamate, 0.39 g. phenylmercuric propionate, and 0.46 g. DBPC antioxidant were added. (d) The mixture was cooled to room temperature under vacuum and with shaking to give a resultant thixotropic B-component having the composition shown below in Table 20 and the viscosity (Brookfield LVT, No. 4 spindle, 25° C.) shown in Table 21.

TABLE 20

| Ingredient: | Amount (wt. percent) |
| --- | --- |
| Partially aminated diol | 63.5 |
| Calcined clay | 31.0 |
| Talc | 3.4 |
| Burnt umber pigment | 0.21 |
| 2-hydroxyethyl 2-hydroxypropyl carbamate | 1.70 |
| Phenylmercuric propionate catalyst | 0.11 |
| DBPC antioxidant | 0.13 |

TABLE 21

| Spindle speed (r.p.m.): | Viscosity (cps.) |
| --- | --- |
| 3 | 14,200 |
| 6 | 10,800 |
| 12 | 8,100 |
| 30 | 6,000 |
| 60 | 5,020 |

An elastomer was prepared by mixing 100.0 g. of the thixotropic B-component having the composition of Table 20 with 7.9 g. of a polymethylene polyphenyl isocyanate A-component (PAPI® 901) in a paper cup for 60 seconds and pouring a portion of the mixture into a second paper cup which served as a mold. The mixture was allowed to cure at ambient temperature. After 3.6 hour curing, the Shore $A_2$ 0-sec. hardness was 17. After an overnight (15 hour) cure the Shore $A_2$ 0-sec. hardness was in the range of 37-38.

Having described our invention above, those skilled in the art can easily make modifications and variations thereof without departing from the scope and spirit of the claims which follow.

What is claimed is:

1. A thixotropic B-component for the production of a filled polyurethane elastomer comprising a filler and a polyether polyol reactant wherein said polyol reactant contains at least one percent by weight of a partially aminated polyoxyalkylene resin having a functionality of from 2 to 8 and an equivalent weight of from about 900 to about 2800; and having from about 5% to about 55% amino groups and, correspondingly, 95% to about 45% hydroxyl groups.

2. The thixotropic B-component of claim 1 wherein the polyether polyol reactant contains from 1 wt. percent to about 50 wt. percent of the partially aminated polyoxyalkylene resin and, correspondingly, from about 50 wt. percent to about 99 wt. percent of a polyether polyol having a molecular weight from about 500 to about 10,000.

3. The thixotropic B-component of claim 1 wherein the partially aminated polyoxyalkylene resin is difunctional or trifunctional and contains from about 17% to about 47% amine groups and, correspondingly, from about 53% to about 83% hydroxyl groups.

4. The thixotropic B-component of claim 3 wherein the partially aminated polyoxyalkylene resin is difunctional.

5. The thixotropic B-component of claim 3 wherein the partially aminated polyoxyalkylene resin has an equivalent weight of from about 1500 to about 2300.

6. The thixotropic B-component of claim 1 wherein the filler comprises an inorganic filler.

7. The thixotropic B-component of claim 6 wherein the inorganic filler is present in amount of about 5 wt. percent to about 80 wt. percent of the B-component.

8. The thixotropic B-component of claim 7 wherein the sole polyol reactant is the partially aminated polyoxyalkylene resin.

9. A thixotropic B-component for the production of a filled polyurethane elastomer which comprises:
 (a) an inorganic filler;
 (b) a polyether polyol reactant consisting essentially of at least about 1 wt. percent of a partially aminated polyoxyalkylene resin having a functionality of from 2 to 8 and an equivalent weight of from about 900 to about 2800 having from about 5% to about 55% amino groups and a conventional polyether polyol having a functionality of from 2 to 4 and a molecular weight of from about 500 to about 10,000;
 (c) a catalyst of polyurethane formation; and
 (d) a cross-linking agent.

10. The thixotropic B-component of claim 9 wherein polyether polyol reactant consists essentially of from about 15 wt. percent to about 50 wt. percent of a partially aminated polyoxyalkylene resin having a functionality of 2 or 3 and an equivalent weight of from about 1500 to about 2300 and having from about 17% to about 47% amino groups, and wherein the conventional polyether polyol is a diol or triol having a molecular weight of from about 3000 to about 7000.

11. The thixotropic B-component of claim 10 wherein the conventional polyol has from about 45% to about 85% primary hydroxyl groups.

12. A thixotropic filled curable polyurethane elastomer composition which comprises an organic polyisocyanate A-component and a thixotropic B-component comprising a filler and a polyether polyol reactant containing at least one percent by weight of a partially aminated polyoxyalkylene resin having a functionality of from 2 to 8 and and equivalent weight of from about 900 to about 2800; and having from about 5% to about 55% amino groups and, correspondingly, 95% to about 45% hydroxyl groups; and wherein the isocyanate index is from about 0.9 to about 1.4.

13. The curable polyurethane composition of claim 12 wherein the filler and the polyether polyol reactant contains from about 15 wt. percent to about 50 wt. percent of the polyoxyalkylene resin, wherein said resin is difunctional or trifunctional having an equivalent weight of from about 1500 to about 2300 and from about 17% to about 47% amino groups; and wherein the polyol reactant contains from about 85 wt. percent to about 50 wt. percent of a conventional polyether polyol having a functionality of from two to four and a molecular weight of from about 3000 to about 7000.

References Cited
UNITED STATES PATENTS

| | | | |
|---|---|---|---|
| 3,714,127 | 1/1973 | Frabis et al. | 260—77.5 AQ |
| 3,705,834 | 12/1972 | Terry | 260—37 N |
| 3,642,044 | 2/1972 | Fertig et al. | 260—37 N |
| 3,489,723 | 1/1970 | Kraft | 260—37 N |
| 3,607,822 | 9/1971 | Nishino | 260—37 N |
| 2,955,056 | 10/1960 | Knox | 260—77.5 AM |

ALLAN LIEBERMAN, Primary Examiner

S. L. FOX, Assistant Examiner

U.S. Cl. X.R.

252—182; 260—77.5 AQ